United States Patent
Bhopte et al.

(10) Patent No.: US 9,415,357 B2
(45) Date of Patent: Aug. 16, 2016

(54) HONEYCOMB BODY INTERDIGITATED MIXERS AND METHODS FOR PRODUCING

(75) Inventors: Siddharth Bhopte, Chandler, AZ (US); James Scott Sutherland, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 829 days.

(21) Appl. No.: 13/578,389

(22) PCT Filed: Feb. 28, 2011

(86) PCT No.: PCT/US2011/026396
§ 371 (c)(1),
(2), (4) Date: Aug. 10, 2012

(87) PCT Pub. No.: WO2011/106757
PCT Pub. Date: Sep. 1, 2011

(65) Prior Publication Data
US 2012/0308769 A1     Dec. 6, 2012

Related U.S. Application Data

(60) Provisional application No. 61/308,988, filed on Feb. 28, 2010.

(51) Int. Cl.
*B01J 19/24* (2006.01)
*F28F 13/00* (2006.01)
(Continued)

(52) U.S. Cl.
CPC .......... *B01F 5/0644* (2013.01); *B01J 19/0093* (2013.01); *B01J 19/2485* (2013.01); *B28B 11/12* (2013.01); *B01J 2219/00085* (2013.01);
(Continued)

(58) Field of Classification Search
None
See application file for complete search history.

(56) References Cited

U.S. PATENT DOCUMENTS

| 3,881,701 A | 5/1975 | Schoenman et al. ............. 259/4 |
| 4,041,591 A | 8/1977 | Noll et al. .................... 29/157.3 |

(Continued)

FOREIGN PATENT DOCUMENTS

| CN | 1411393 | 4/2003 | |
| EP | 1767886 | 3/2007 | ............... F28D 9/00 |

(Continued)

OTHER PUBLICATIONS
Machine Translation CN1411393.
(Continued)

*Primary Examiner* — David Sample
*Assistant Examiner* — Nicholas W Jordan
(74) *Attorney, Agent, or Firm* — Gregory V. Bean

(57) ABSTRACT

Honeycomb body interdigitating mixers have parallel cells extending along a common direction, the mixer comprising a first fluid path extending within a honeycomb body perpendicular to the common direction, at least a high aspect ratio portion of the first fluid path having an aspect ratio of height in the common direction to width perpendicular to the common direction and to the first path direction of at least 3:1, and a second fluid path extending perpendicular to the common direction, the second fluid also having a high aspect ratio portion having an aspect ratio of at least 3:1, wherein the first fluid path is fluidically connected to the second fluid path within their respective high aspect ratio portions via a group of apertures, the group extending in the common direction, the group of apertures taken together having a ratio of height to width of at least 3:1.

7 Claims, 5 Drawing Sheets

(51) Int. Cl.
*B01F 5/06* (2006.01)
*B01J 19/00* (2006.01)
*B28B 11/12* (2006.01)
*F28F 13/06* (2006.01)

(52) U.S. Cl.
CPC .............. *B01J2219/00092* (2013.01); *B01J 2219/00788* (2013.01); *B01J 2219/00824* (2013.01); *B01J 2219/00831* (2013.01); *B01J 2219/00873* (2013.01); *B01J 2219/00889* (2013.01); *F28F 13/06* (2013.01); *F28F 2250/108* (2013.01); *Y10T 29/49826* (2015.01); *Y10T 428/24149* (2015.01)

(56) References Cited

U.S. PATENT DOCUMENTS

| | | | |
|---|---|---|---|
| 4,041,592 A * | 8/1977 | Kelm | B01D 63/066 428/117 |
| 4,746,479 A * | 5/1988 | Hanaki | F28F 7/02 264/629 |
| 4,971,450 A | 11/1990 | Gerich | 366/340 |
| 5,094,788 A | 3/1992 | Schrenk et al. | 264/171 |
| 5,094,793 A | 3/1992 | Schrenk et al. | 264/171 |
| 5,320,428 A | 6/1994 | Streiff | 366/337 |
| 5,373,634 A | 12/1994 | Lipp | 29/890.03 |
| 5,803,600 A | 9/1998 | Schubert et al. | 366/144 |
| 6,077,436 A * | 6/2000 | Rajnik et al. | 55/523 |
| 6,082,891 A | 7/2000 | Schubert et al. | 366/338 |
| 6,264,900 B1 | 7/2001 | Schubert et al. | 422/224 |
| 6,305,834 B1 | 10/2001 | Schubert et al. | 366/144 |
| 6,321,998 B1 | 11/2001 | Schubert et al. | 239/8 |
| 6,558,558 B1 * | 5/2003 | Hall | B01J 19/2485 210/221.1 |
| 6,695,044 B1 * | 2/2004 | Symonds | B01J 19/249 165/166 |
| 6,802,640 B2 | 10/2004 | Schubert et al. | 366/181.6 |
| 6,942,792 B2 | 9/2005 | Aso | 210/198.2 |
| 6,982,064 B1 | 1/2006 | Ehrfeld et al. | 422/130 |
| 7,485,266 B2 | 2/2009 | Ito et al. | 422/224 |
| 2004/0034266 A1 * | 2/2004 | Brophy | B01J 19/0093 422/198 |
| 2005/0213425 A1 | 9/2005 | Wang et al. | 366/150.1 |
| 2006/0089717 A1 | 4/2006 | Krishna et al. | 366/340 |
| 2009/0041635 A1 * | 2/2009 | Berkey | B28B 11/12 55/523 |
| 2009/0092526 A1 | 4/2009 | Miller | 422/187 |
| 2010/0135873 A1 | 6/2010 | Sutherland | 422/218 |
| 2010/0143215 A1 | 6/2010 | Caze et al. | 422/198 |
| 2010/0147676 A1 * | 6/2010 | Goudy, Jr. | B08C 3/08 204/164 |
| 2012/0148457 A1 | 6/2012 | Sutherland et al. | 422/222 |

FOREIGN PATENT DOCUMENTS

| | | | |
|---|---|---|---|
| WO | 2008/121390 | 10/2008 | B01J 19/24 |
| WO | 2010/127211 | 11/2010 | B01J 19/00 |

OTHER PUBLICATIONS

CN201180011287.2 Search Report.
V. Hessel et al; "Laminar Mixing in Different Interdigital Micromixers: I. Experimental Characterization"; AIChE Journal; Mar. 2003; vol. 49, No. 3; p. 566-577.
S. Hardt et al; "Laminar Mixing in Different Interdigital Micromixers: II. Numerical Simulations"; AIChE Journal; Mar. 2003; vol. 49, No. 3; p. 578-584.
Leung et al; "A method for rapid reaction optimisation in continuous-flow microfluidic reactors using online Raman spectroscopic detection"; The Analyst' 2005; 130; p. 46-51.

* cited by examiner

_US 9,415,357 B2_

HONEYCOMB BODY INTERDIGITATED MIXERS AND METHODS FOR PRODUCING

This application claims the benefit of priority of U.S. Provisional Application No. 61/308,988 filed on Feb. 28, 2010.

BACKGROUND

The present invention relates in general to honeycomb body fluid mixers, and in particular to honeycomb body interdigitated mixers and to methods for producing such mixers.

Techniques for fabricating low-cost continuous flow chemical reactors based on extruded honeycomb bodies have been presented previously by the present inventors and/or their colleagues, for example, as disclosed in EP publication No. 2098285, assigned to the present assignee.

The present disclosure aims to add to the range of reactors of this type by providing honeycomb body reactors capable of fine interdigitation of flows and by providing practical methods of producing such mixers.

SUMMARY

One embodiment includes a interdigitating mixer formed within a honeycomb body, the honeycomb body having parallel cells extending along a common direction, the mixer comprising a first fluid path extending within the honeycomb body along a first path direction perpendicular to the common direction, the first fluid path defined within a first plurality of said cells, at least a high aspect ratio portion of the first fluid path having an aspect ratio of height in the common direction to width perpendicular to the common direction and to the first path direction of at least 3:1, and a second fluid path extending within the honeycomb body along a second path direction perpendicular to the common direction, the second fluid path defined within a second plurality of said cells, at least a high aspect ratio portion of the second fluid path having an aspect ratio of height in the common direction to width perpendicular to the common direction and to the second path direction of at least 3:1, wherein the first fluid path is fluidically connected to the second fluid path within their respective high aspect ratio portions via a group of apertures, the group extending in the common direction, the group of apertures taken together having a ratio of height in the common direction to width perpendicular to the common direction of at least 3:1.

A further embodiment includes methods of forming an interdigitating mixers in a honeycomb body by providing a honeycomb body having parallel cells extending along a common direction separated by cell walls, forming a first fluid path extending within the honeycomb body along a first path direction perpendicular to the common direction and having at least a high aspect ratio portion having an aspect ratio of height in the common direction to width perpendicular to the common direction and to the first path direction of at least 3:1, forming a second fluid path extending within the honeycomb body along a first path direction perpendicular to the common direction and having at least a high aspect ratio portion having an aspect ratio of height in the common direction to width perpendicular to the common direction and to the second path direction of at least 3:1, and forming the first and second paths such that the first and second paths are separated, at at least one cell wall of the extruded body along their respective high aspect ratio portions, by only the at least one cell wall, and forming apertures through the at least one cell wall such that the apertures are arranged in a group, the group of apertures taken together having a ratio of height in the common direction to width perpendicular to the common direction of at least 3:1.

The resulting mixers can provide fine interdigitation of fluid flows in a high-heat exchange capable, high-strength extruded body. Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
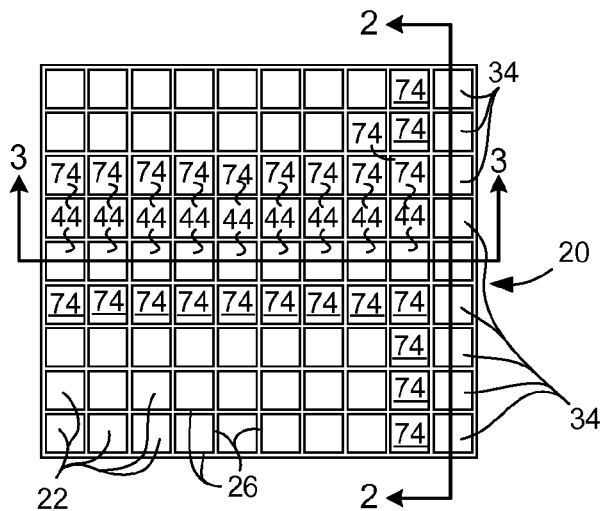
FIG. 1 is a plan view of one end of a honeycomb body.
Figure 4:
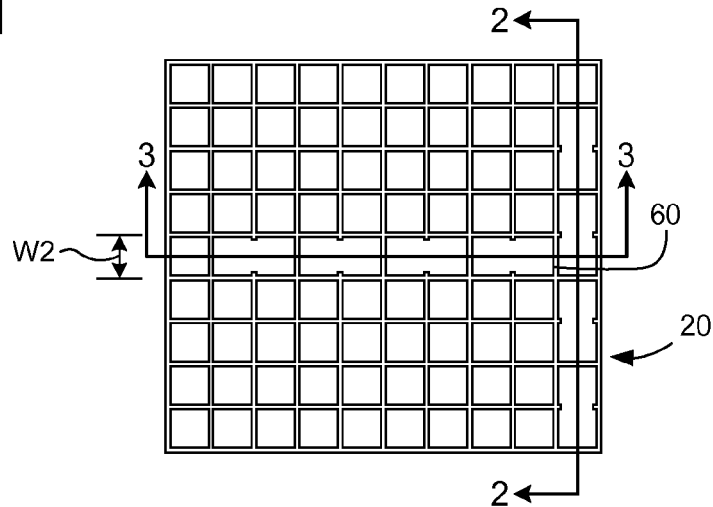
FIGS. 4 and 7 are the same view as FIG. 1 at successive points in the fabrication process of certain embodiments.

Reference will now be made in detail to the accompanying drawings which illustrate certain instances of the methods and devices described generally herein. Whenever possible, the same reference numerals will be used throughout the drawings to refer to the same or like parts.

According to one embodiment of the present invention, a method is provided for forming a honeycomb body mixer in the form of an interdigitated mixer within a honeycomb extrusion substrate. As seen in FIGS. 1-7, the method includes providing a honeycomb body 20 as shown in plan view at one end face thereof in FIGS. 1, 4 and 7, and in cross-sectional view, at the cross sections indicated in FIGS. 1, 4, and 7, in FIGS. 2, 3, 5 and 6. The body 20 has parallel cells 22 extending along a common direction D (not shown in FIGS. 1, 4 and 7 where the direction D is in and out of plane of the page) separated and defined by cell walls 26. The method includes forming a first fluid path 30, as shown in FIG. 6B, extending within the honeycomb body 20 along a first path direction P1 perpendicular to the common direction D and having at least a high aspect ratio portion 36 having an aspect ratio of height H1 in the common direction D to width W1 (as seen in FIG. 5B), perpendicular to the common direction D and to the first path direction P1, of at least 3:1.

Figure 5:
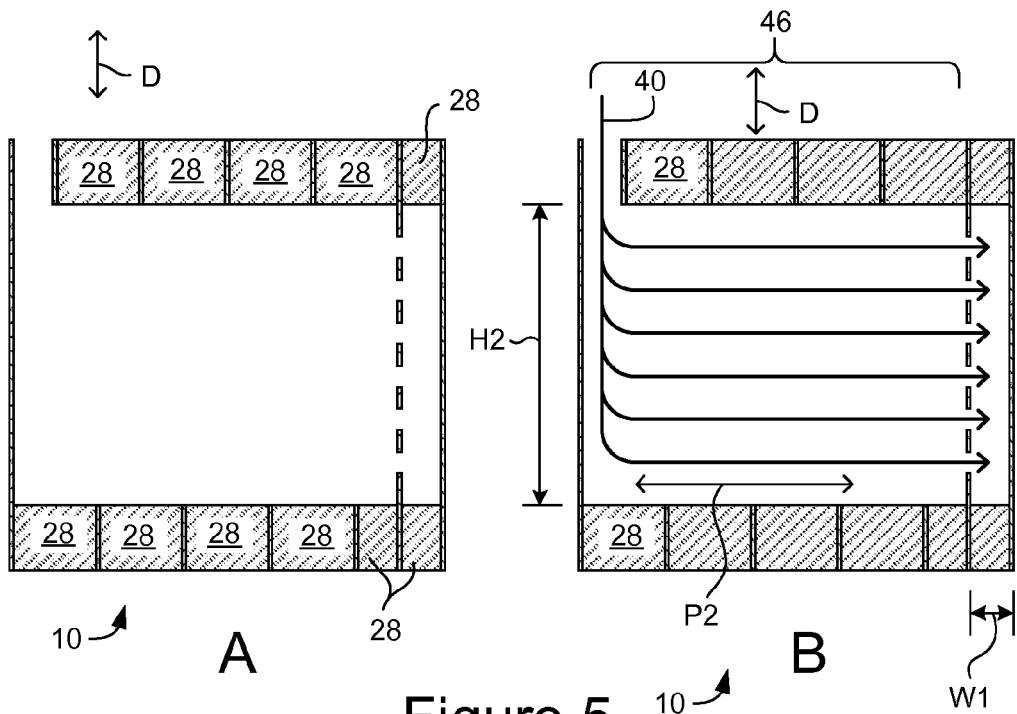
FIGS. 5A-5B and 6A-6B are views during the fabrication process of certain embodiments, of the indicated cross sections in FIG. 7.
Figure 6:
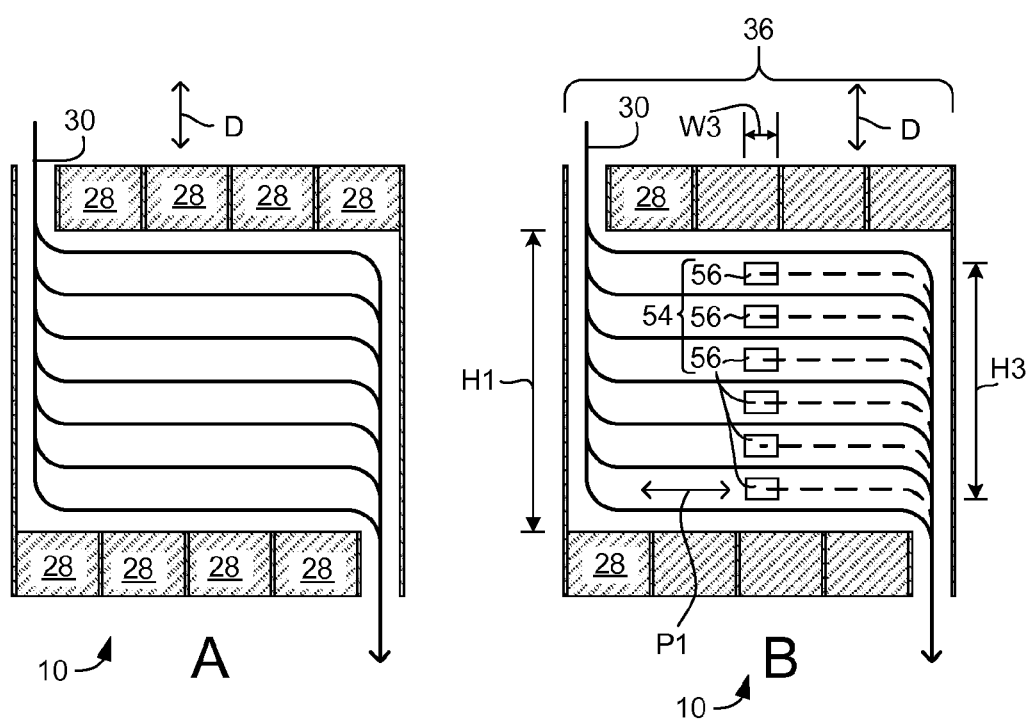

As best seen with respect to FIG. 5, the method also includes forming a second fluid path 40 extending within the honeycomb body 20 along a second fluid path direction P2 perpendicular to the common direction D and having at least a high aspect ratio portion 46 having an aspect ratio of height H2 in the common direction D to width W2 (indicated in FIG. 4), perpendicular to the common direction D and to the second path direction P2, of at least 3:1. The first and second paths 30, 40 are formed such they are separated, at at least one cell wall 60 of the extruded body 20 along their respective high aspect ratio portions, by only the at least one cell wall 60.

As may be seen in FIGS. 5A-B and 6B, apertures 56 are formed through the at least one cell wall 60 such that the apertures 56 are arranged in a group 54, the group 54 of apertures 56 taken together having a ratio of height H3 in the common direction D to width W3 perpendicular to the common direction of at least 3:1. The result is an interdigitated mixer formed within a honeycomb body, allowing for quick, high efficiency mixing of two fluid flows, all within an extruded body easily modified to according to the methods described below to provide the mixer structure. Desirably, the extruded body is of ceramic, glass, or glass-ceramic, with alumina being currently preferred. The forming steps my desirably take place after extrusion of a ceramic, glass or glass-ceramic honeycomb body, but before firing, while the extruded body is in the green state. A more detailed description of a few embodiments of forming methods is given below with particular respect to FIGS. 2 and 3.

An embodiment of a process or method for forming the first fluid path 30 includes removing al of, or portions of, selected cell walls of a first plurality of cells 34, indicated in FIGS. 1 and 2A, and then closing the open ends of the first plurality of cells 34. As seen in FIGS. 2A-D, the walls or portions thereof of the cells 34 may desirably be removed by the use of a plunge cutting tool 62, desirably when the honeycomb body is in a green state, that is, after extrusion and before firing. Desirably, alternate walls are removed, except for a portion 70 at one end, from alternate ends of the honeycomb body 20, as represented in FIGS. 2B and 2C.

As an alternative to the cutting or machining represented in FIGS. 2B and 2C, a special extrusion die may be employed that extrudes a honeycomb body having at least one elongated cell therein elongated in a direction perpendicular to the common direction. The elongated cell allows formation of all or at least a portion of the first fluid path therein, by closing the open ends of the at least one elongated cell, effectively eliminating some or all of the cell walls that would otherwise be machined as in FIGS. 2B and 2C.

Figure 7:
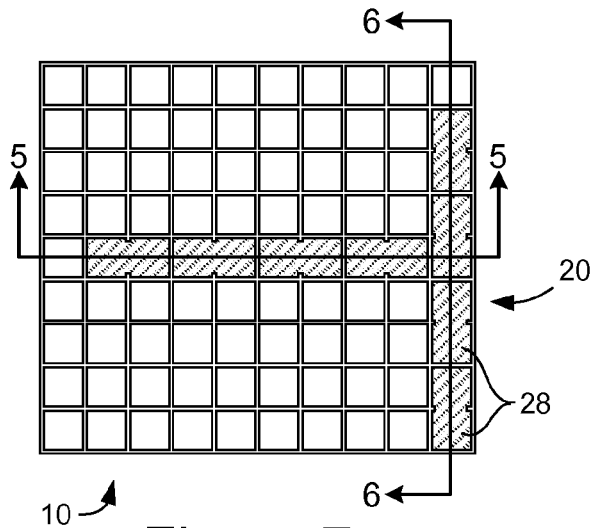
Figure 2:
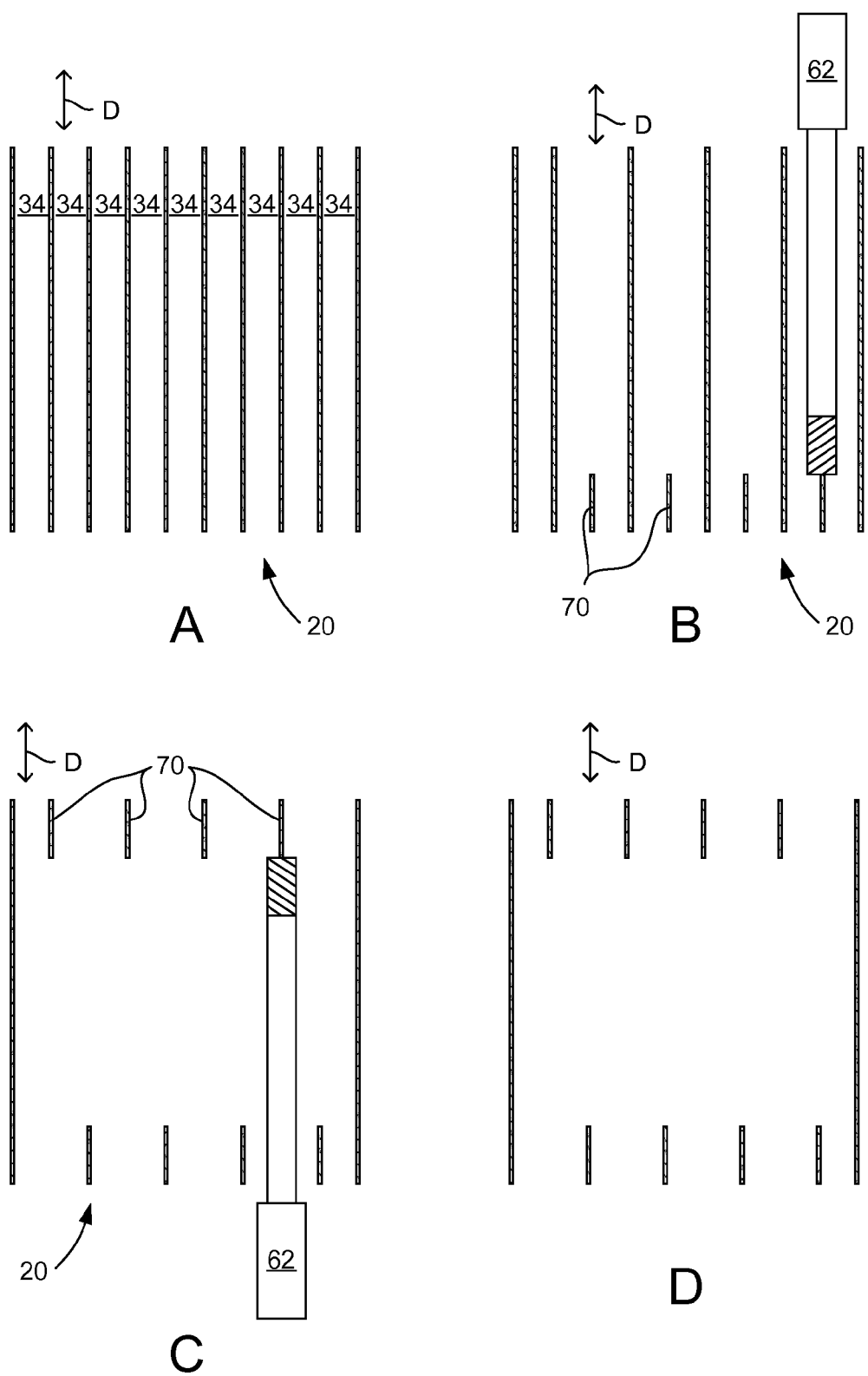
FIGS. 2A-2D are successive views during the fabrication process of certain embodiments, of the indicated cross sections in FIGS. 1 and 4.
Figure 3:
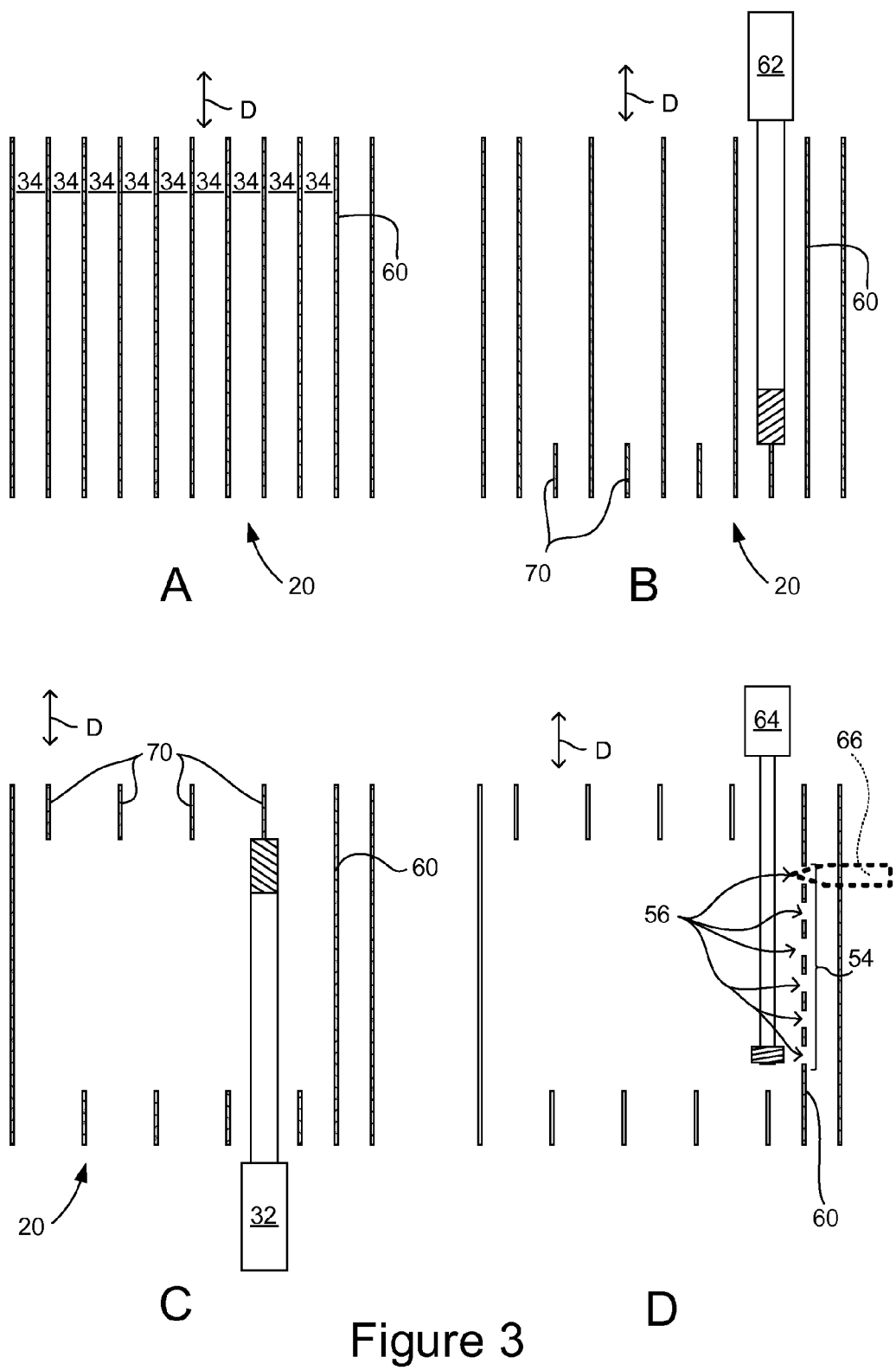
FIGS. 3A-3D are successive views during the fabrication process of certain embodiments, of the indicated cross sections in FIGS. 1 and 4.

Closing the open ends of cells may be performed in various ways, such as by inserting plugs or plug material to form individual plugs 28 or longer continuous plugs 28 at the open ends of the selected cells, as seen in FIGS. 6A, 6B and 7. Plug material may be a glass or ceramic frit material inserted in the cells to be plugged in a green extruded body, mixed with an organic binder with or without a UV curable component, for example. Curing the UV curable component, if present, tends to allow the binder to perform better during debinding and firing of the plug material, keeping the plugs in place and in shape. For some applications, removable elastomeric plugs may even be used. FIGS. 7A and 7B show the plugs 28 or continuous plugs 28 closing the ends of the cells 34, with FIG. 7A omitting some features for clearer viewing.

The second first fluid path 40 may be formed in the same way, including removing al of, or portions of, selected cell walls of a second plurality of cells 44, indicated in FIGS. 1 and 3A, and then closing the open ends of the first plurality of cells 44. As seen in FIGS. 3A-D, the walls or portions thereof of the cells 44 may desirably be removed as with cells 34 by the use of a plunge cutting tool 62. As above, desirably, alternate walls are removed, except for a portion 70 at one end, from alternate ends of the honeycomb body 20, as represented in FIGS. 3B and 3C. The first and second paths 30, 40 and the respective pluralities of cells 34, 44 in which they are formed are positioned and/or chosen such that the first and second paths 30, 40 are separated, at at least one cell wall 60 of the extruded body 20 along their respective high aspect ratio portions 36, 46 by only the at least one cell wall 60. As seen in FIGS. 3B-3C, this at least one cell wall 60 is not removed by the plunge cutting tool 62.

Instead, apertures 56 joining the first and second fluid paths 30, 40 are formed through the cell wall 60. According to one embodiment, this is achieved by cutting the apertures 56 through the at least one cell wall 60 with a plunging side-cutting tool 64 inserted at an end of the honeycomb body 20, as represented in FIG. 3D. This allows the formation of many narrow apertures 56, depending on the selected thinness of the cutting head of the tool 64, having a generally rectangular shape as represented in FIG. 6B.

Figure 8:
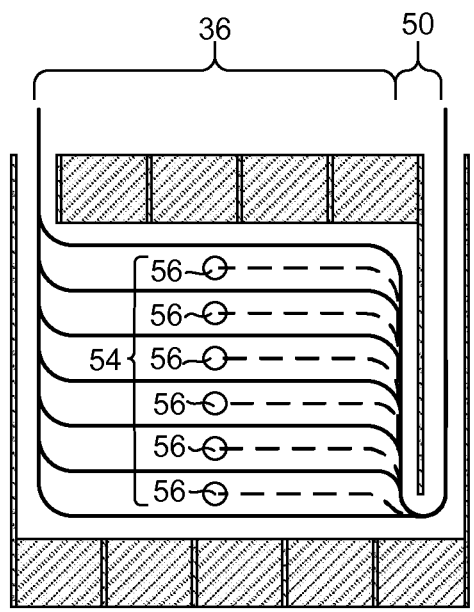
FIG. 8 is a similar view to the cross section of FIG. 6B, but showing yet another embodiment.

Alternatively, the apertures 56 may be formed by drilling the apertures 56 through the at least one cell wall 60 and through at least one or more other cell walls as needed so as to reach the at least one cell wall 60 from the exterior of the honeycomb body 20, as shown for example by the dashed-outline drill bit 66 shown at the right of FIG. 3D. Standard mechanical or ultrasonic machining may be used, or laser drilling, if desired. The unwanted apertures in the outer cell wall or any other unwanted apertures opened by this drilling are then closed by patching with frit and firing along with the plugs and the honeycomb body itself, or by other suitable means. Drilled apertures 56, having a more round perimeter than those of FIG. 6B are represented in FIG. 8.

The cells 44 are then closed at their open ends by the plugs 28 or continuous plugging material 28 or other means, resulting in the structure shown in FIGS. 5A and 5B, with 5A omitting some structure for easier viewing.

As may be understood from the foregoing methods, the resulting structure, as seem in FIGS. 5-7, may be described as a honeycomb body interdigitating mixer 10, the body having parallel cells 22 extending along a common direction D, the mixer comprising (1) a first fluid path 30 extending within the honeycomb body 20 along a first path direction P1 perpendicular to the common direction D, the first fluid path 30 defined within a first plurality of said cells 34, at least a high aspect ratio portion 36 of the first fluid path 30 having an aspect ratio of height H1 in the common direction D to width W1 perpendicular to the common direction D and to the first path direction P1 of at least 3:1; and (2) a second fluid path 40 extending within the honeycomb body 20 along a second path direction P2 perpendicular to the common direction D, the second fluid path 40 defined within a second plurality of said cells 44, at least a high aspect ratio portion 46 of the second fluid path 40 having an aspect ratio of height H2 in the common direction to width W2 perpendicular to the common direction D and to the second path direction P2 of at least 3:1; and wherein the first fluid path 30 is fluidically connected to the second fluid path 40 within their respective high aspect ratio portions 36, 46 via a group 54 of apertures 56, the group 54 extending in the common direction D, the group 54 of apertures 56 taken together having a ratio of height H3 in the common direction D to width W3 perpendicular to the common direction D of at least 3:1. Desirably the mixer 10 includes a third plurality 74 of the cells 22 of the body 20, including cells adjacent the first and second pluralities of cells 34, 44, as shown in FIG. 1, that is open at both ends of the body or is otherwise provided with or enabled to receive a flow or one or more flows of thermal control fluid.

The aspect ratio of the high aspect ratio portions 36, 46 of the first and second fluid paths 30, 40 is desirably at least 5:1, or even at least 9:1, which aspect ratio is still easily achievable by the methods disclosed herein. Te respective high aspect ratio portions 36, 46 of one or both of the first and second fluid paths 30, 40 may includes the entire length of the respective fluid path, optionally excluding fluid ports for access to the respective paths from the exterior of the honeycomb body, as represented in FIGS. 2, 3, 5, and 6. Alternatively, the first fluidic path 40 may extend along its respective path direction P1 on both sides of the group of apertures 54, and the first fluidic path may includes a low aspect ratio portion 50 along its path on at least one side of the group of apertures 54, as shown in FIG. 8. The second fluidic path may, as shown in the embodiments in the figures, end at the group of apertures 54, but it may also continue on in another direction, as an alternative embodiment (not shown).

Figure 9:
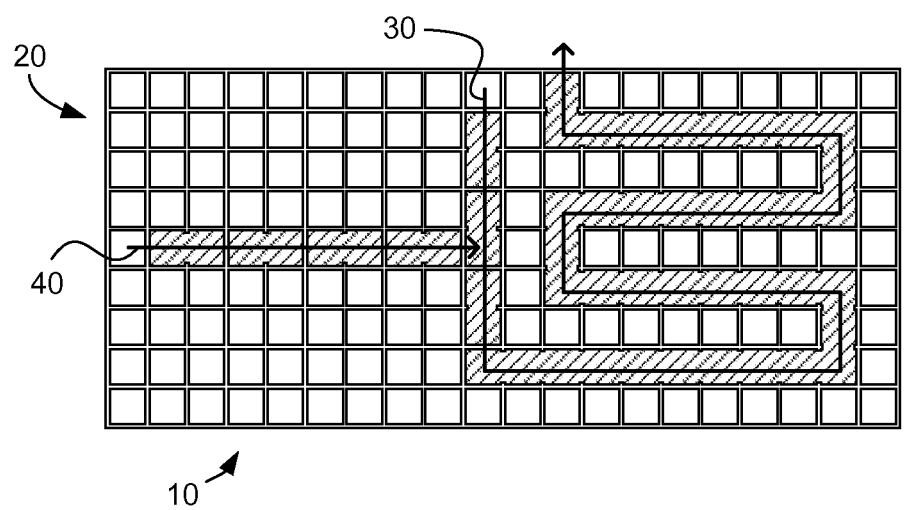
FIG. 9 is a similar view to the view of FIG. 7, but showing still another embodiment.

The path directions P1 and P2 of the first and second paths 30, 40 need not be constant, but may change if desired, although they typically will always lie perpendicular to the common direction D. As an example, it may in many cases be desirable to increase the length of the first path 30, particularly on the side beyond the location of the group 54 of apertures 56 where the two paths 30, 40 meet. A honeycomb body interdigitating mixer with such an extended first path 30 not having a constant path direction P1 is shown in plan view, similar to the view of FIG. 7, in FIG. 9.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

It will be apparent to those skilled in the art that various modifications and variations can be made without departing from the spirit or scope of the invention.

What is claimed is:

1. A honeycomb body interdigitating mixer, the body having parallel cells extending along a common direction, the mixer comprising:
   a first fluid path extending within the honeycomb body along a first path direction perpendicular to the common direction, the first fluid path defined within a first plurality of said cells, at least a high aspect ratio portion of the first fluid path having an aspect ratio of height in the common direction to width perpendicular to the common direction and to the first path direction of at least 3:1; and
   a second fluid path extending within the honeycomb body along a second path direction perpendicular to the common direction, the second fluid path defined within a second plurality of said cells, at least a high aspect ratio portion of the second fluid path having an aspect ratio of height in the common direction to width perpendicular to the common direction and to the second path direction of at least 3:1;
   wherein the first fluid path is fluidically connected to the second fluid path within their respective high aspect ratio portions via a group of apertures, the group extending in the common direction, the group of apertures taken together having a ratio of height in the common direction to width perpendicular to the common direction of at least 3:1.

2. The mixer according to claim 1, wherein a third plurality of said cells, including cells adjacent the first and second pluralities of cells, is open at both ends of the body or is otherwise provided with or enabled to receive a flow of thermal control fluid.

3. The mixer according to claim 1, wherein the aspect ratio of the high aspect ratio portion of the first and second fluid paths is at least 5:1.

4. The mixer according to claim 1, wherein the aspect ratio of the high aspect ratio portion of the first and second fluid paths is at least 9:1.

5. The mixer according to claim 1, wherein the respective high aspect ratio portion of one or both of the first and second fluid paths includes the entire length of the respective fluid path, optionally excluding fluid ports for access to the respective paths from the exterior of the honeycomb body.

6. The mixer according to claim 1, wherein the second fluidic path extends along its respective path direction on both sides of said group of apertures, and wherein the second fluid path includes a low aspect ratio portion along said path on at least one side of said group of apertures.

7. The mixer according to claim 1, wherein the first fluid path ends at the group of apertures.

* * * * *